(12) United States Patent
Benson et al.

(10) Patent No.: US 10,632,866 B2
(45) Date of Patent: Apr. 28, 2020

(54) MOVEMENT SYSTEM FOR A VEHICLE SEAT

(71) Applicant: Faurecia Automotive Seating, LLC, Auburn Hills, MI (US)

(72) Inventors: Matthew K. Benson, Holland, MI (US); Cedric Ketels, Auburn Hills, MI (US); Brian R. Dexter, Grand Haven, MI (US); Rod Goodrich, Auburn Hills, MI (US); Garrett Goodwin, Grand Rapids, MI (US); Tristan Vanfossen, Auburn Hills, MI (US); Kevin L. Wright, Highland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 312 days.

(21) Appl. No.: 15/614,024

(22) Filed: Jun. 5, 2017

(65) Prior Publication Data
US 2017/0349061 A1 Dec. 7, 2017

Related U.S. Application Data

(60) Provisional application No. 62/345,207, filed on Jun. 3, 2016.

(51) Int. Cl.
*B60N 2/02* (2006.01)
*B60N 2/22* (2006.01)
*B60N 2/66* (2006.01)
*B60N 2/90* (2018.01)

(52) U.S. Cl.
CPC ......... *B60N 2/0244* (2013.01); *B60N 2/2222* (2013.01); *B60N 2/665* (2015.04); *B60N 2/914* (2018.02); *B60N 2/976* (2018.02); *B60N 2002/0268* (2013.01)

(58) Field of Classification Search
None
See application file for complete search history.

(56) References Cited

U.S. PATENT DOCUMENTS

| | | | | |
|---|---|---|---|---|
| 5,551,951 A * | 9/1996 | Fradkin | ................. | A61H 15/00 601/115 |
| 8,042,868 B2 * | 10/2011 | Sakai | .................... | B60N 2/002 200/5 R |
| 8,126,616 B2 | 2/2012 | Phipps | | |
| 9,187,020 B2 | 11/2015 | Meyer | | |
| 2005/0093353 A1* | 5/2005 | Schussler | ............. | B60N 2/0248 297/284.4 |
| 2007/0239090 A1* | 10/2007 | Mitea | ................. | A61H 15/0078 601/112 |
| 2009/0294259 A1* | 12/2009 | Kuno | ................... | B60N 2/0228 200/4 |
| 2010/0283299 A1* | 11/2010 | Onuma | ................. | B60N 2/002 297/337 |

(Continued)

OTHER PUBLICATIONS

2009 BMW X5 Sports Activity Vehicle Brochure, 2008, 30 pages.

Primary Examiner — Dale W Hilgendorf
Assistant Examiner — Alexander C. Bost
(74) Attorney, Agent, or Firm — Barnes & Thornburg LLP (57) ABSTRACT

A vehicle seat in accordance with the present disclosure includes a seat bottom and a seat back. The seat back is coupled to the seat bottom to move relative to the seat bottom. The seat bottom is coupled to a floor of a vehicle and configured to move relative to the seat back.

13 Claims, 8 Drawing Sheets

(56) References Cited

U.S. PATENT DOCUMENTS

| | | | |
|---|---|---|---|
| 2014/0097657 A1* | 4/2014 | Hozumi | B60N 2/0244 |
| | | | 297/344.1 |
| 2014/0207333 A1* | 7/2014 | Vandivier | B60N 2/976 |
| | | | 701/36 |
| 2015/0251573 A1* | 9/2015 | Misch | B60N 2/665 |
| | | | 297/452.41 |
| 2016/0059750 A1* | 3/2016 | Lem | A61H 9/0078 |
| | | | 601/149 |
| 2016/0200228 A1* | 7/2016 | Saren | A61H 9/0078 |
| | | | 601/150 |
| 2016/0229320 A1* | 8/2016 | Lem | A61H 9/0078 |
| 2016/0296413 A1* | 10/2016 | Norman | A61H 9/0078 |
| 2017/0240079 A1* | 8/2017 | Petrovski | B60N 2/02 |
| 2018/0304774 A1* | 10/2018 | Mizoi | B60N 2/976 |
| 2018/0370405 A1* | 12/2018 | Klein | B60N 2/665 |

\* cited by examiner

MOVEMENT SYSTEM FOR A VEHICLE SEAT

PRIORITY CLAIM

This application claims priority under 35 U.S.C. § 119(e) to U.S. Provisional Application Ser. No. 62/345,207, filed Jun. 3, 2016, which is expressly incorporated by reference herein.

BACKGROUND

The present disclosure relates to a vehicle seat and particularly to a vehicle seat that changes position. More particularly, the present disclosure relates to a vehicle seat that includes a sensor.

SUMMARY

According to the present disclosure, a vehicle seat in accordance with the present disclosure includes a seat bottom and a seat back. The seat back is coupled to the seat bottom to move relative to the seat bottom. The seat bottom is coupled to a floor of a vehicle and configured to move relative to the seat back.

In illustrative embodiments, an occupant-support system includes the vehicle seat, a sensor system, a computer, and a motion unit. The sensor system is configured to detect information about the vehicle, the arrangement of the vehicle seat, and the occupant's biometric data. The computer is configured to determine a status of the vehicle, the arrangement of the vehicle seat including a position of the seat bottom and seat back, and status of comfort equipment included in or on the vehicle seat. Using predetermined criteria and data from the sensors, the computer creates an adjustment profile which will improve comfort of the occupant over time and commands the motion unit to change the configuration of the vehicle seat and comfort equipment according to the adjustment profile.

In illustrative embodiments, the computer commands the motion unit to move the seat bottom and the seat back relative to a floor of the vehicle as part of the adjustment profile when the vehicle is stationary. The sensor system provides data to the computer regarding whether the vehicle is stationary or moving.

In illustrative embodiments, the computer commands the motion unit to vary only the comfort equipment when the vehicle is moving. In illustrative embodiments, the comfort equipment includes a massage system, lumbar adjustment, temperature variation, bolster adjustments, upper backrest-adjustment, pneumatic systems, sounds systems, aroma-therapy systems, and the like.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 10-12 are a series of views showing another embodiment of a process used to maximize comfort of an occupant when the vehicle is stationary;

DETAILED DESCRIPTION

Figures 1, 2, 3:
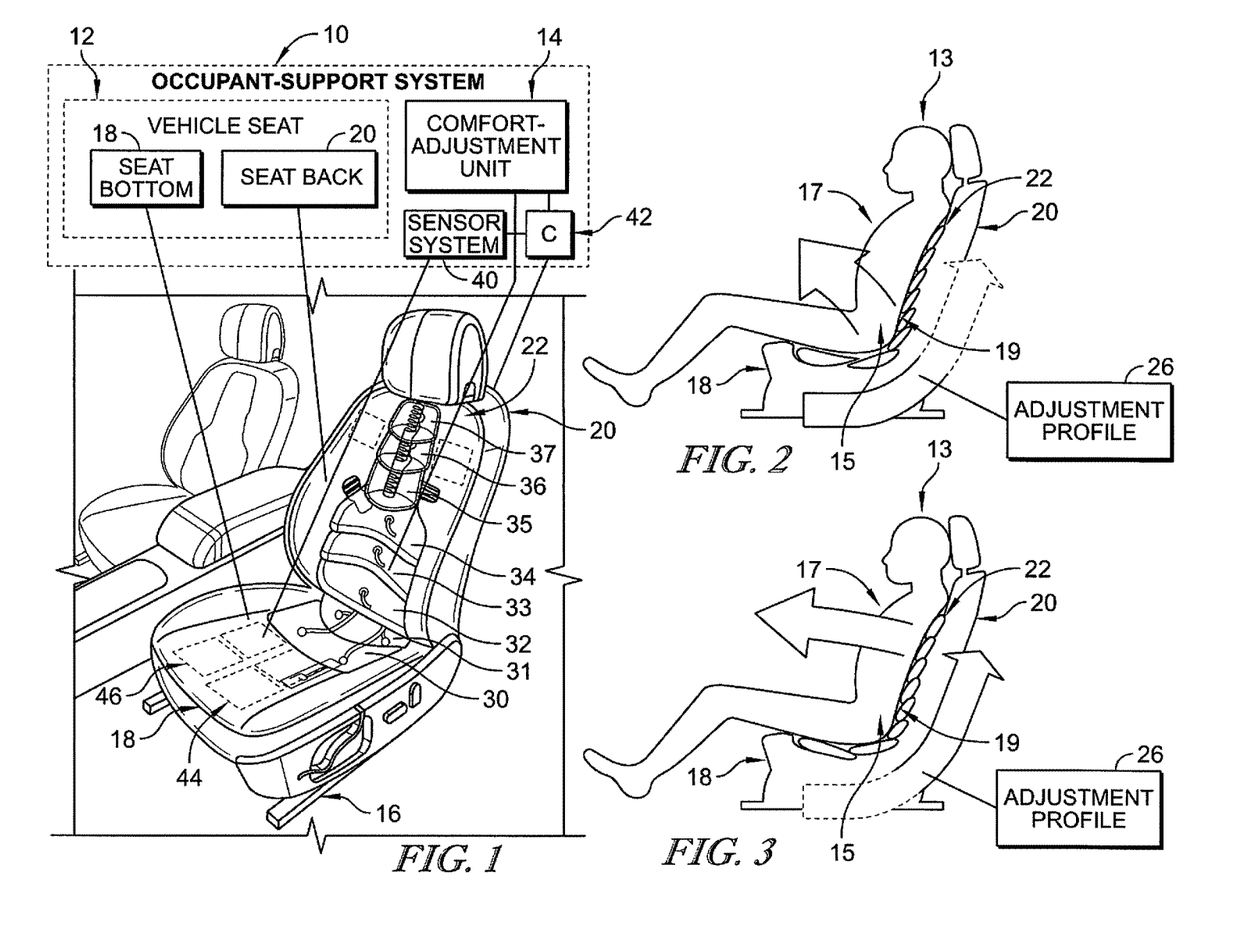
FIG. 1 is a perspective view of an occupant support system including a vehicle seat and a seat adjustment unit and showing that the vehicle seat includes a plurality of bladders positioned within a seat bottom and a seat back and a sensor unit positioned in the seat bottom to detect biometric signals.
FIG. 2 is a side view of the occupant support system of FIG. 1 showing an occupant seated on the vehicle seat and the plurality of bladders being inflated according to an adjustment profile to adjust a position of the occupant so that occupant comfort is maximized.
FIG. 3 is a view similar to FIG. 2 showing the plurality of bladders being deflated according to the adjustment profile to adjust a position of the occupant and maximize comfort.

An occupant support system 10 in accordance with the present disclosure includes a vehicle seat 12, a sensor system 40, a computer 42, and a comfort-adjustment unit 14 as shown in FIG. 1. Occupant-support system 10 includes a vehicle seat 12 which is coupled to a floor of a vehicle to provide support for an occupant 13 during operation of the vehicle. Sensor system 40 provides sensor signals to the computer 42 which uses the sensor signals and predetermined criteria to create an adjustment profile 26 of the occupant. The adjustment profile 26 maximizes comfort of the occupant over time during each period of travel and cumulatively over a number of uses of the occupant support system 10. The computer 42 commands the comfort-adjustment unit 14 to change a configuration of the vehicle seat 12 according to the adjustment profile 26.

Vehicle seat 12 includes a seat foundation 16, a seat bottom 18, a seat back 20, and a motion unit. Seat foundation 16 is coupled to a floor of the vehicle and is configured to secure the vehicle seat 12 to the vehicle. Seat bottom 18 is coupled to seat foundation 16 and provides a base for the occupant to sit on while operating the vehicle. Seat back 20 is coupled to seat bottom 18 and extends in an upward direction away from seat bottom 18.

The motion unit includes a seat-adjustment unit and a comfort-adjustment unit 14. The seat-adjustment unit includes a seat-bottom actuator (powered or manual) for moving the seat bottom relative to the floor and a seat-back actuator (powered or manual) for moving the seat back relative to the seat bottom. The comfort-adjustment unit 14 includes equipment on or in the vehicle seat which maximizes occupant comfort.

In one illustrative example, comfort-adjustment unit 14 includes a plurality of bladders 22 and an inflation unit (not shown) for inflating the plurality of bladders 22. The comfort-adjustment unit 14 may also include a massage system, lumbar adjustment, temperature variation, bolster adjustments, upper backrest adjustment, pneumatic systems, sounds systems, aroma-therapy systems, combinations thereof, and any other suitable alternatives.

As shown in FIGS. 2 and 3, adjustment profile 26 is represented by an arrow that gradually extends from seat bottom 18 to seat back 20. Bladders 22 are configured to inflate in series according to adjustment profile 26 as shown in FIG. 2. Once all of the bladders 22 are inflated, bladders 22 are configured to deflate in series according to adjustment profile 26 as shown in FIG. 3. Adjustment profile 26 is configured to cause a series of movements in occupant 13 to adjust a pelvis region 15 of occupant 13 to establish a pelvis angle 9 thereby relieving stress and fatigue as suggested in FIG. 13. In the illustrative example of FIGS. 2 and 3, the adjustment profile 26 may be used whether the vehicle is stationary or moving as the seat-adjustment unit is not engaged.

In a first movement, bladders 30, 31, 32, 33, 34, 35, 36, and 37 are inflated in seat bottom 18 in series as suggested by adjustment profile 26 in FIG. 2. The first movement is smooth and slow and decreases support in a lumbar region 19 of occupant 13. This movement causes pelvis region 15 of occupant 13 to move radially outward and axially forward in relation to vehicle seat 12. As the bladders in seat back 20 are inflated, lumbar region 19 of occupant 13 is pushed away from the vehicle seat 12 and pelvis region 15 rotates slightly forward.

In a second movement, bladders 30, 31, 32, 33, 34, 35, 36, and 37 are deflated in series as suggested by adjustment profile 26 in FIG. 3. When the bladders 22 in seat bottom 28 are deflated, support in lumbar region 19 is increased and may cause a slight bend in occupant 13 in lumbar region 19. This movement causes pelvis region 15 of occupant 13 to move radially inward toward vehicle seat 12 and may cause pelvis region 15 to rotate slightly. As such, pelvis region 15 is returned to a normal condition once the bladders 22 in vehicle seat 12 are fully deflated.

This cycle is repeated to position pelvis region 15 of occupant 13 in a pre-determined position. Under certain conditions, bladders 22 are configured to inflate and deflate repetitively so that occupant 13 is placed in a rocking motion as described above. The rocking motion promotes a pelvis position of occupant 13 during operation of the vehicle which reduces fatigue, improves comfort and blood flow, and reduces body pain.

Figure 4:
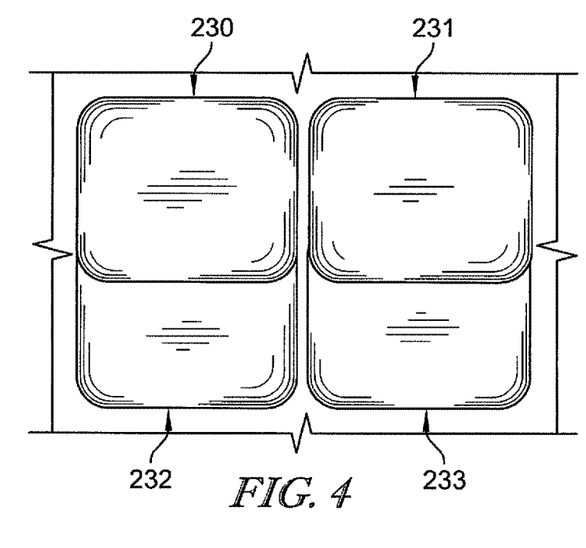
FIG. 4 is a plan view of a plurality of bladders included in a comfort-adjustment unit included in the occupant-support system configured to provide lateral and longitudinal massage therapy to an occupant.
Figure 5:
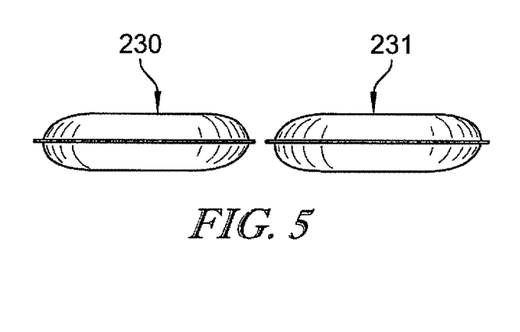
FIG. 5 is a front elevation view of the plurality of bladders of FIG. 4 showing the bladders in an inflated state.
Figure 6:
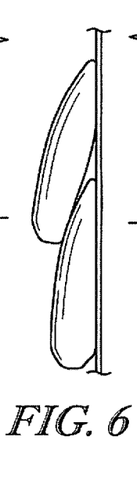
FIG. 6 is a side elevation view of another embodiment of a plurality of bladders showing upper bladders in overlapping relation to lower bladders.

Illustratively, any number of bladders may be used in vehicle seat 12 to promote the pre-determined pelvis position in occupant 13. Additionally, bladders 22 may be used in both seat bottom 18 and seat back 20, or may be use in one of the seat bottom 18 or the seat back 20. One possible configuration for bladders 22 is shown in FIGS. 4 and 5. This configuration includes four independent inflatable bladders 230, 231, 232, 233 integrated into seat back 20 of vehicle seat 12. The adjustable bladders 230-233 receive a source of pressurized fluid (e.g., compressed air) from at least one pneumatic drive system (not shown). The pump distributes pressurized fluid to bladders 230-233 of seat back 20 to inflate and deflate the bladders according to adjustment profiles 26, 27 shown in FIGS. 2 and 3 and described above.

Figure 7:
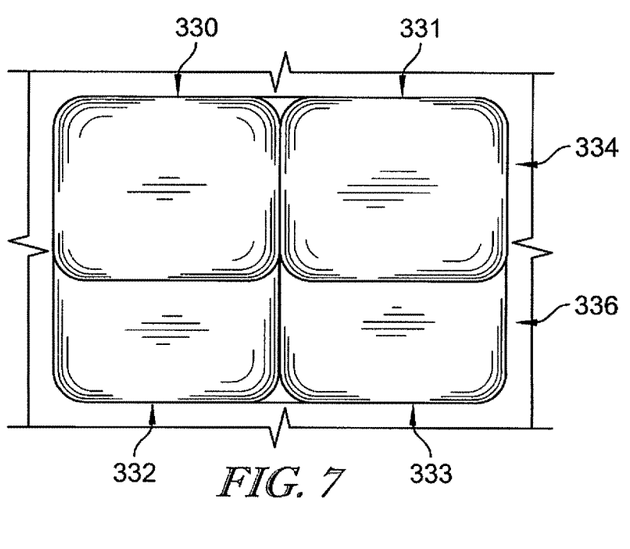
FIG. 7 is a plan view of another embodiment of a plurality of bladders included in a comfort-adjustment unit suggesting that the top bladders are welded together along adjoining sides to create two pieces, each piece having a separately inflatable chamber.
Figure 8:
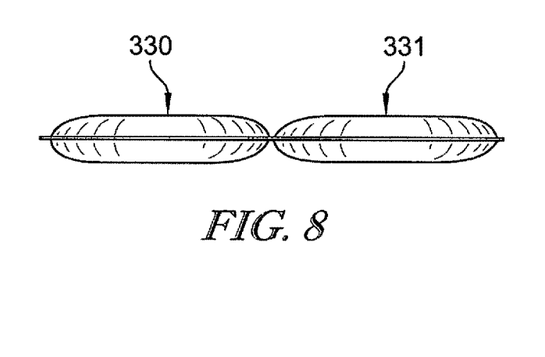
FIG. 8 is a front elevation view of the plurality of bladders of FIG. 7 showing the bladders in an inflated stated.

Illustratively, another possible configuration of bladders 22 includes four bladders 330, 331, 332, and 333 as shown in FIGS. 7 and 8. Bladders 330-333 are welded in the middle to create two sets 334, 336 each including a separately inflated chamber. Sets 334, 336 receive a source of pressurized fluid (e.g., compressed air) from at least one pneumatic drive system (not shown). A pump distributes pressurized fluid to sets 334, 336 within seat back 20 to inflate and deflate the bladders according to adjustment profiles 26, 27 shown in FIGS. 2 and 3 and described above.

The plurality of bladders 22 are arranged within seat bottom 18 and seat back 20 and overlap so that they provide gradual motion as individual bladders are inflated and deflated as suggested in FIGS. 2-3. The plurality of bladders 22 are inflated and deflated separately to provide an adjustment profile 26 that adjusts the posture of the occupant to reduce stress caused by extended driving periods so that long-term comfort is maximized and maintained. Illustratively, bladders 22 may be arranged so that seat bottom 18 includes a first bladder 30 and a second bladder 31 as shown in FIG. 1. Illustratively, seat back 20 includes a third bladder 32, a forth bladder 33, a fifth bladder 34, a sixth bladder 35, a seventh bladder 36, and an eighth bladder 37.

Bladders 22, 230-233, and 330-333 may be configured to inflate and deflate independently to provide for massage to occupant 13. The massaging may include up and down movements, side to side movements, or any other massaging sensation. Additionally, occupant 13 may select a massage program or personalize a desired one.

Figure 9:
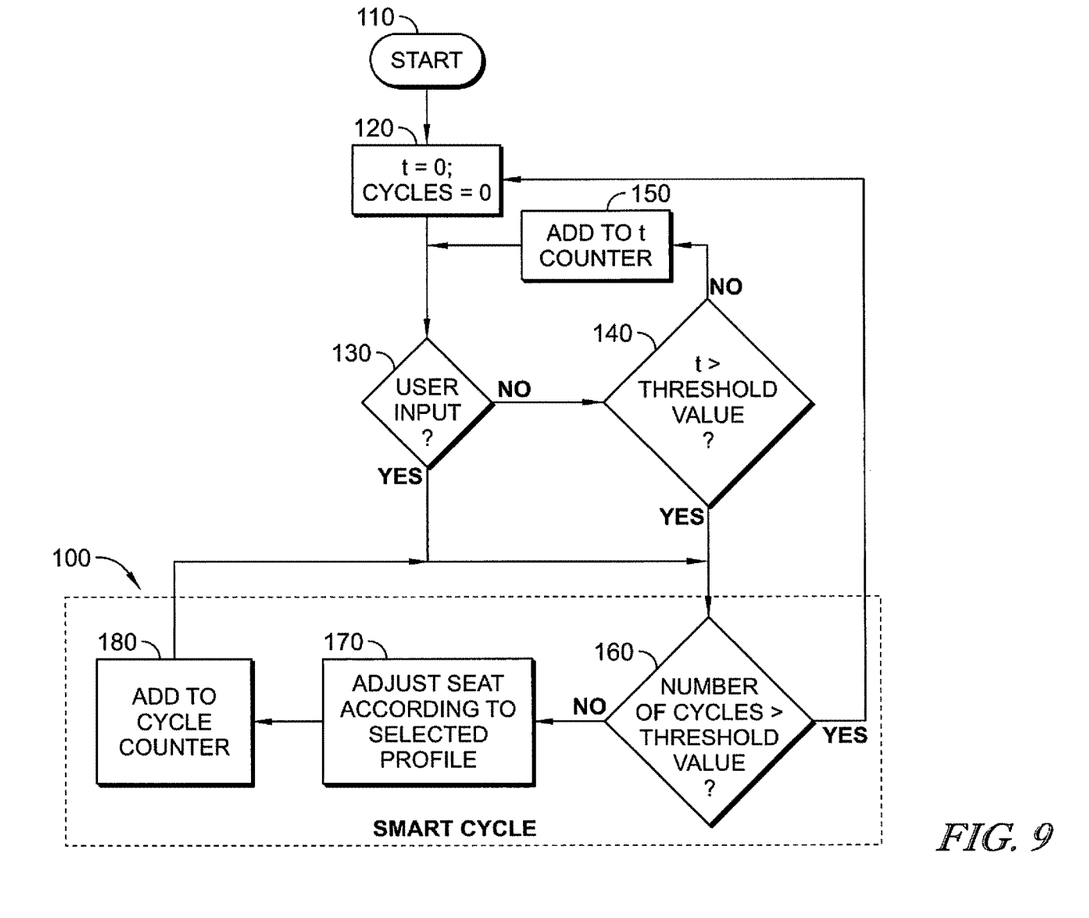
FIG. 9 is a diagrammatic view showing one embodiment of a process used to maximize comfort of an occupant.

Comfort-adjustment unit 14 is operated by a smart cycle 100, also called a comfort cycle, as shown in FIG. 9. Smart cycle 100 is configured to perform the coordinated motions described above and shown in FIGS. 2 and 3 during operation of the vehicle. Smart cycle 100 provides different seat movements to cause occupant 13 to maintain the pre-determined pelvis position to reduce fatigue, improve comfort and blood flow, and reduce body pain during operation of the vehicle. Thus, smart cycle 100 is configured to engage and adjust the comfort-adjustment unit 14 through the coordinated cycle represented by adjustment profile 26. In the example shown in FIGS. 2 and 3, the comfort-adjustment unit 14 inflates and deflates the plurality of bladders 22 according to the adjustment profile.

Occupant support system 10 further includes a sensor system 40 and a computer 42 that are used in the operation of smart cycle 100. Sensor system 40 is configured to generate sensor signals based upon various conditions. Computer 42 is configured to receive the sensor signals generated by sensor system 40 and to operate smart cycle 100 based on those sensor signals.

Sensor system 40 includes a vehicle-seat sensor unit 44 and a user sensor unit 46. Vehicle-seat sensor unit 44 is configured to detect an arrangement of the vehicle seat 12 relative to a floor of the vehicle and to send sensor signals to computer 42. User sensor unit 46 is configured to detect a position of occupant 13 relative to vehicle seat 12 and to send sensor signals to computer 42. Additionally, user sensor unit 46 may include biometric sensors configured to sense fatigue and stress levels that may occur in occupant 13 during operation of the vehicle over long periods of time. Based on the signals received by computer 42, smart cycle 100 may adjust comfort-adjustment unit 14 so that the bladders 22 are inflated or deflated according to adjustment profile 26 thereby reducing fatigue and stress levels in occupant 13.

Vehicle-seat sensor unit 44 and user sensor unit 46 may be integrated into seat bottom 18 or into the seat back 20 or any other locations in the vehicle. The biometric sensors may be any type of biometric sensors such as electrocardiogram (ECG), ballistocardiogram (BCG), blood oxygenation, heart rate variability, respiration rate, cameras, infrared, sweat, temperature, relative humidity, combinations thereof, or any other suitable biometric sensor.

Computer 42 is configured to receive the sensor signals generated by vehicle-seat sensor unit 44 and user sensor unit 46 and, under some conditions, operate smart cycle 100 as shown in FIG. 9. When occupant 13 enters the vehicle at start 110, computer 42 determines an arrangement of the vehicle seat relative to the floor of the vehicle when occupant 13 has been seated on the vehicle seat using the sensor signals.

Figure 13:
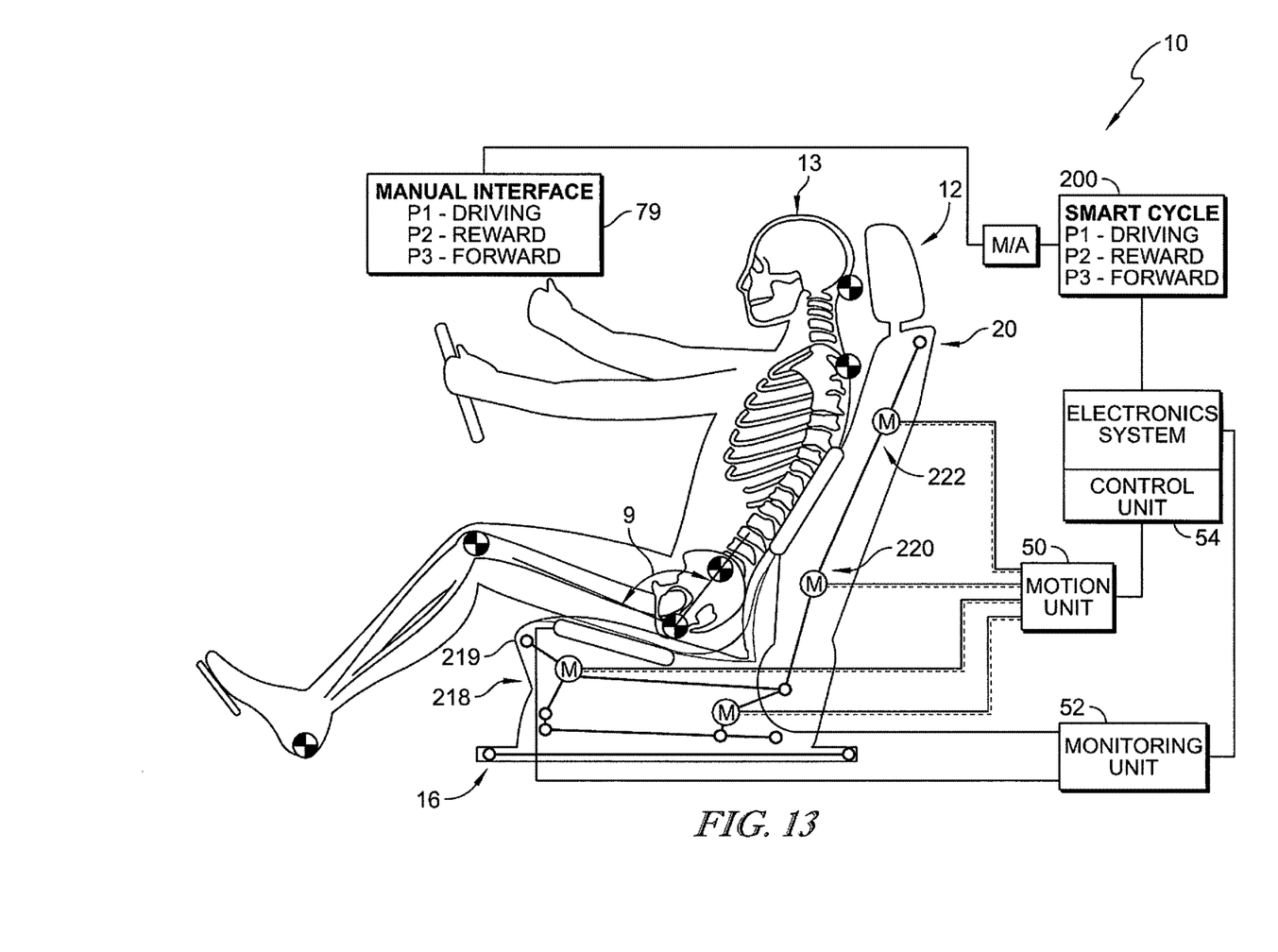
FIG. 13 is a diagrammatic view showing one embodiment of an occupant support system in accordance with the present disclosure showing that the occupant support system includes a vehicle seat, a sensor system, a motion unit, and control unit configured to enact a smart cycle on the vehicle seat to maximize occupant comfort.

Occupant support system 10 further includes a human machine interface 79 to allow occupant 13 to interact with the smart cycle 100 and select operation modes as shown in FIG. 13. Occupant 13 may manually adjust vehicle seat 12 to a preferred position or the preferred position may be previously set by occupant 13 using interface 79. Occupant 13 may also use interface 79, as shown in FIG. 13, to select between manual and automatic configurations 78. Such inputs may be included as predetermined criteria. The preferred position of occupant 13 is assumed to be the posture which maximizes comfort and provides for a predetermined pelvis-angle position. Smart cycle 100 is configured to adjust vehicle seat 12 until occupant 13 has returned to this position as suggested in FIG. 9.

At station 120, sensor system 40 senses when occupant 13 first enters vehicle seat 12 at a time t equal to zero and when the number of cycles performed by smart cycle 100 is also equal to zero. Station 120 sends a signal to computer 42 to automatically start a timer counter which increases the time value.

If occupant 13 selects a user input at station 130, smart cycle 100 will automatically initiate and adjust vehicle seat 12 to the setting selected at user input 130. Alternatively, if there is no user input at station 130, computer 42 determines if the amount of time t is greater than a predetermined time period programmed into computer 42 at station 140. The predetermined time period may be included in the predetermined criteria.

At station 140, smart cycle 100 will initiate and begin adjusting vehicle seat 12 according to adjustment profile 26 if the amount of time is greater than the predetermined time period. If the amount of time is less than the predetermined time period, a value of 1 is added to the time counter at station 150. This loop is repeated until a user input occurs at station 130 or the amount of time exceed the predetermined time period programmed into computer 42. If either of these events occurs, smart cycle 100 will be initiated.

Once smart cycle 100 is initiated, computer 42 determines if the number of cycles completed by vehicle seat 12 is greater than a predetermined cycle count programmed into computer 42 at station 160. The predetermined cycle count may also be included in the predetermined criteria. If the number of cycles completed by vehicle seat 12 is less than the predetermined cycle count, the vehicle seat is adjusted according to adjustment profile 26 at station 170 and a value of 1 is added to the cycle counter at station 180. If the number of cycles completed by vehicle seat 12 is greater than the predetermined cycle count, the entire sequence resets to station 120 with a time equal to zero and the number of cycles equal to zero.

Computer 42 may be programmed with a threshold level of fatigue and stress and these values may be included in the predetermined criteria. If a level of fatigue or stress sensed in occupant 13 by user sensor unit 46 is greater than the threshold level, smart cycle 100 is initiated. Under this situation, the biometric sensors send a signal to computer 42 to initiate smart cycle 100 to adjust according to adjustment profile 26 to relieve fatigue and stress in occupant 13. Smart cycle 100 will reset to station 120 once the sensed level of fatigue or stress in occupant 13 is below the threshold level.

The occupant support may be embodied as an adjustable or otherwise movable vehicle seat and may include multiple parts, including a seat bottom, a seat back, and/or a head restraint. The vehicle seat may include one or more controllers, actuators, and/or other components to provide one or more therapies. Therapies may include active surface movement including massage, lumbar and bolster, postural adjustment and other moveable surfaces that enable and/or encourage postural movement. Climate therapies may include heat, cool, venting, scent, air quality, lighting (red/blue), and music and may also be used.

The occupant support system may further include multiple controllers, which each may be embodied as an electronic control unit or other controller configured to perform the functions described herein. In particular, and as described further below, a controller (e.g., a controller coupled to the vehicle seat) may be configured to receive sensor data from the sensors system. Each controller, also called a computer, may be embodied as any device capable of performing the functions described herein. For example, each controller may be embodied as an electronic control unit, embedded controller, control circuit, microcontroller, computing device, on-board computer, and/or any other any other computing device capable of performing the functions described herein.

An illustrative controller includes a processor, an I/O subsystem, memory, a data storage device, and communication circuitry. The controller may include other or additional components, such as those commonly found in an electronic control unit (e.g., various input/output devices), in other embodiments. Additionally, in some embodiments, one or more of the illustrative components may be incorporated in, or otherwise form a portion of, another component. For example, the memory, or portions thereof, may be incorporated in the processor.

The processor may be embodied as any type of processor capable of performing the functions described herein. For example, the processor may be embodied as a microcontroller, digital signal processor, single or multi-core processor(s), or other processor or processing/controlling circuit. Similarly, the memory may be embodied as any type of volatile or non-volatile memory or data storage capable of performing the functions described herein. In operation, the memory may store various data and software used during operation of the processor such as operating systems, applications, programs, libraries, and drivers. The memory is coupled to the processor via the I/O subsystem, which may be embodied as circuitry and/or components to facilitate input/output operations with the processor, the memory, and other components of the controller. For example, the I/O subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor, the memory, and other components of the controller, on a single integrated circuit chip.

The data storage device may be embodied as any type of device or devices configured for short-term or long-term storage of data such as, for example, memory devices and circuits, memory cards, hard disk drives, solid-state drives, read-only memory, or other data storage devices. The communication circuitry of the controller may be embodied as any communication circuit, device, or collection thereof, capable of enabling communications between the controller and other devices of the vehicle seat and/or the vehicle. The communication circuitry may be configured to use any one or more communication technology (e.g., wireless or wired communications) and associated protocols (e.g., Ethernet, controller area network (CAN), local interconnect network (LIN), Bluetooth®, Wi-Fi®, etc.) to effect such communication. In some embodiments, the communication circuitry may include one or more general-purpose I/O pins, analog interfaces, solid state motor control electronics, and/or other circuitry that may be used to interface with or otherwise control features of the vehicle seat (e.g., seat motion, therapy, or other features).

As further shown in FIG. 1, the computer 42 and sensor system 40 may be configured to transmit and/or receive data with each other and/or other devices over a vehicle network. The vehicle network may be embodied as any bus, network, or other communication facility used to communicate between devices in the vehicle. For example, the vehicle network may be embodied as a wired or wireless local area network (LAN), controller area network (CAN), and/or local interconnect network (LIN). Thus, the vehicle controller may include one or more additional electronic control units, embedded controllers, engine computers, or other computing devices used to control various vehicle functions. In particular, the controller may be configured to communicate with one or more additional vehicle controllers via the vehicle network to determine the state of the vehicle, for example to determine whether the ignition is on, to determine engine speed or engine load, to determine vehicle speed, or to determine other vehicle state. The sensors may be coupled directly to one or more controllers (e.g., a seat controller) without using the vehicle network.

Figures 10, 11, 12:
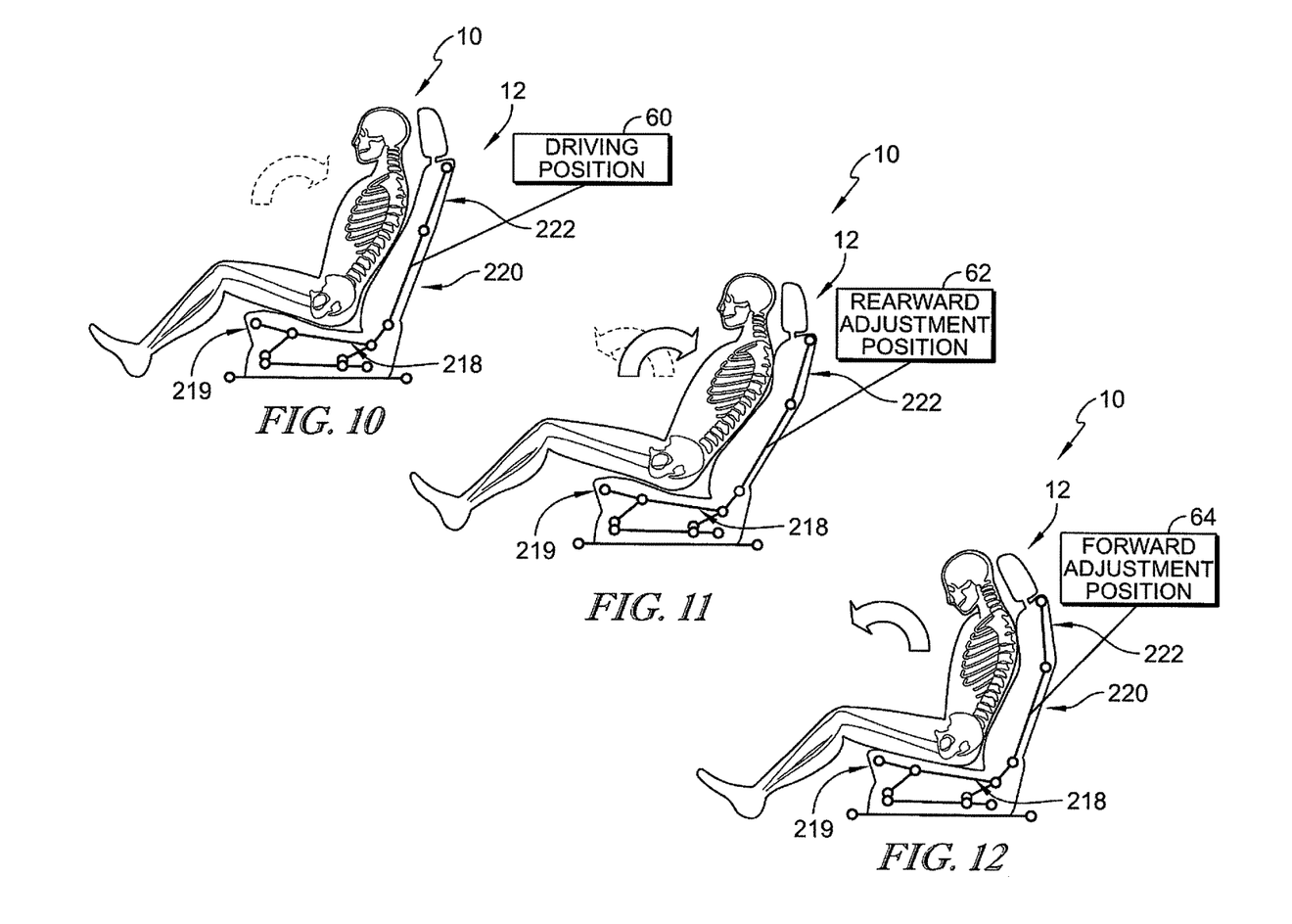
FIG. 10 is diagrammatic view showing an occupant resting on a vehicle seat arranged in a driving position and suggesting that the vehicle seat may be moved after a predetermined time period to maximize comfort of the occupant.
FIG. 11 is a view similar to FIG. 10 showing the vehicle seat moved to a rearward adjustment position after a predetermined time period and suggesting that the vehicle seat may be moved after an additional predetermined time period to maintain comfort of the occupant.
FIG. 12 is a view similar to FIG. 11 showing the vehicle seat moved to a forward adjustment position after the additional predetermined time period completing a cycle of adjustments to maximize occupant comfort.

Another aspect of the present disclosure involves moving a seat bottom 218, a seat bottom edge 219, a lower back support 220, and an upper back support 222 of vehicle seat 12 from a driving position 60 to a rearward adjustment position 62 and to a forward adjustment position 64 as shown in FIGS. 10-12. A motion unit 50 may be used to move the seat bottom 218 and the seat back 206 relative to the floor while the comfort-adjust unit may be used to move the seat bottom edge 219, the lower back support 220, and an upper back support 222. Adjusting these components of vehicle seat 12 may relieve fatigue and stress experienced by occupant 13 while operating the vehicle over long periods of time.

To accomplish these movements, occupant support system 10 further includes a motion unit 50, a sensor system 52, and a control unit 54 as shown in FIG. 13. Motion unit 50 includes, for example, a seat-adjustment unit for the seat bottom and seat back and a comfort-adjustment unit that are configured to adjust vehicle seat 12 from a driving position 60 to a rearward adjustment position 62, and to a forward adjustment position 64. Sensor system 52 includes vehicle-seat sensor unit 44, user sensor unit 46, and a vehicle sensor unit (not shown) and is configured to send signals to control unit 54, also called controller and computer. Control unit 54 includes computer 42 and receives the signals from sensor system 52, also called monitoring unit 52, and instructs motion unit 50 to adjust vehicle seat 12.

Driving position 60 is either selected by occupant 13 or set by computer 42 when occupant 13 enters the vehicle. The position selected by computer 42 may be a position previously set by occupant 13 or may be a predetermined position.

Figure 14:
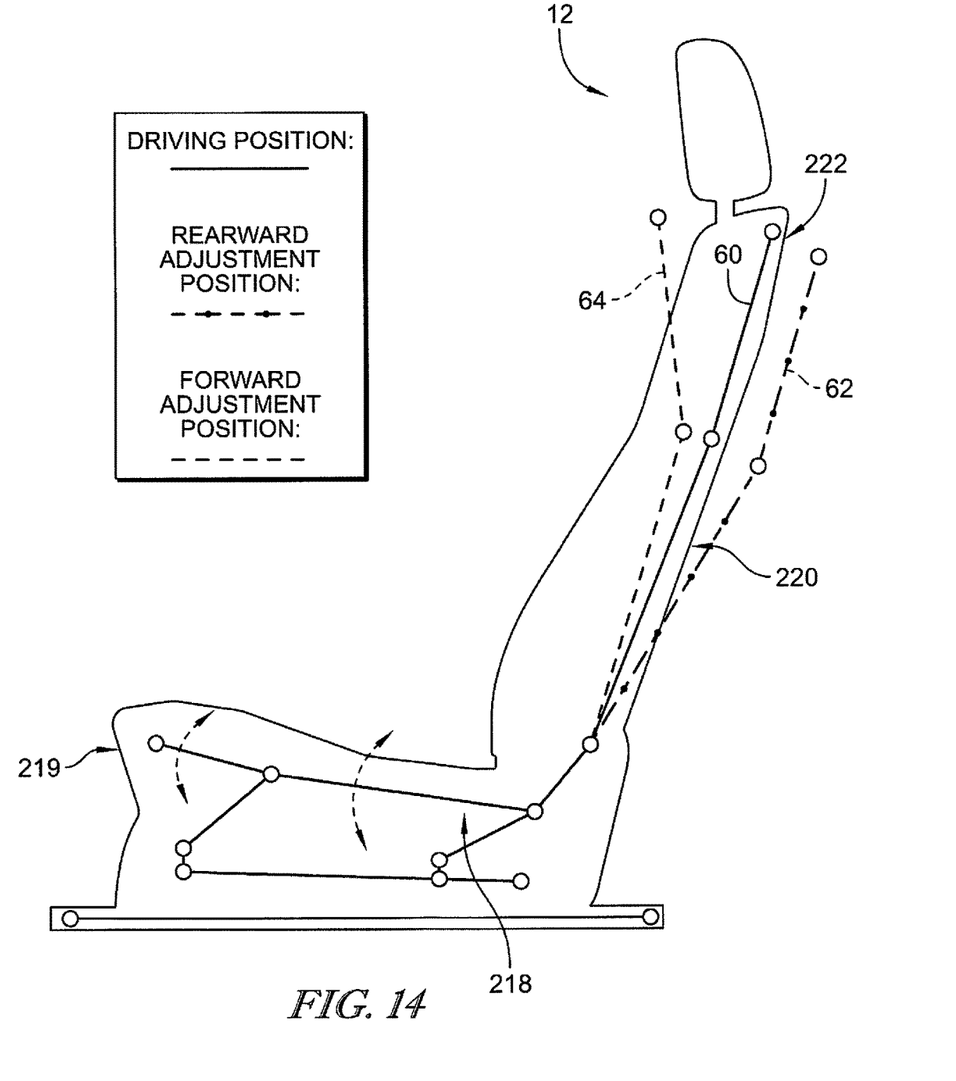
FIG. 14 is a diagrammatic view showing how the vehicle seat moves between the driving position, rearward adjustment position, and forward adjustment position.
Figure 15:
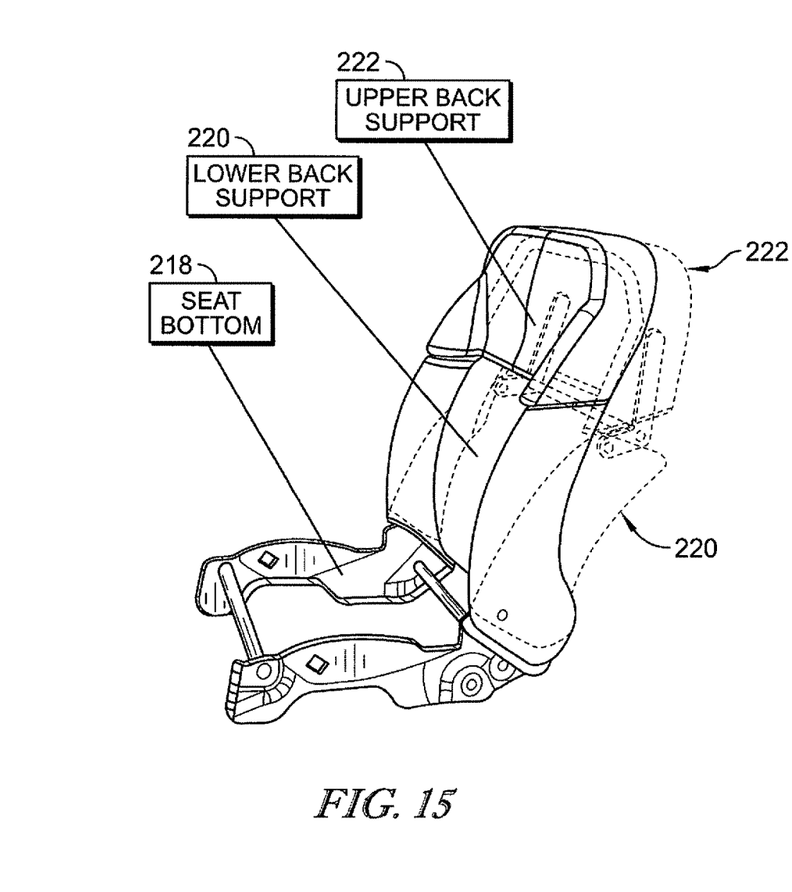
FIG. 15 is a partial front perspective view of a vehicle seat in accordance with the present disclosure showing that a comfort-adjustment system included in the vehicle includes an upper back support movable relative to the seat back and a lower back support movable relative to the seat back.
Figure 16:
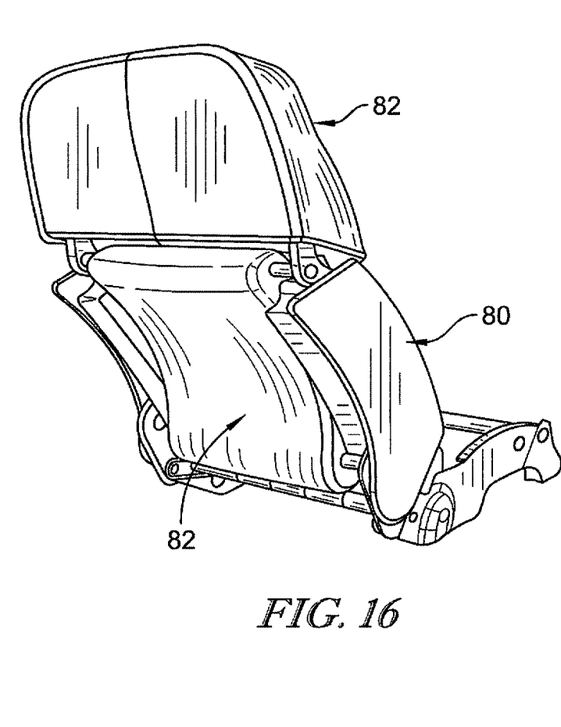
FIG. 16 is a partial rear perspective view of the vehicle seat of FIG. 15.

Motion unit 50 adjusts lower back support 220 is adjusted axially rearward when adjusting vehicle seat 12 into rearward adjustment position 62 as suggested in FIG. 14. Motion unit 50 then adjusts seat bottom 218 and seat bottom edge 219 radially upward. Finally, upper back support 222 is adjusted axially forward relative to lower back support 220.

Motion unit 50 adjusts lower back support 220 and upper back support 222 axially forward into forward adjustment position 64 as suggested in FIG. 14. Motion unit 50 then adjusts seat bottom 218 and seat bottom edge 219 radially downward to rotate pelvis region 15 of occupant 13 into a correct position. Depending on certain conditions, vehicle seat 12 may then adjust back to the rearward adjustment position 62 or may adjust to driving position 60.

Vehicle seat 12 may further comprise a primary frame 80 and secondary support sections 82 as shown in FIG. 18. Primary frame 80 is arranged to permanently secure vehicle seat 12 to the vehicle. Secondary support sections 82 comprise adjustable components of vehicle seat 12 such as seat bottom 218, seat bottom edge 219, lower back support 220, and upper back support 222. Secondary support sections 82 are configured to move from driving position 60, to rearward adjustment position 62, and to forward adjustment position 64 as described above while primary frame 80 remains stationary and secured to the vehicle. Movement of the secondary support sections 82 may be done by the comfort-adjustment unit. This configuration allows occupant 13 to be relieved of fatigue and stress without un-securing parts of vehicle seat 12 which may impact safety of occupant 13. Alternatively, vehicle seat 12 may be configured to adjust only when the vehicle is stationary.

Figure 17:
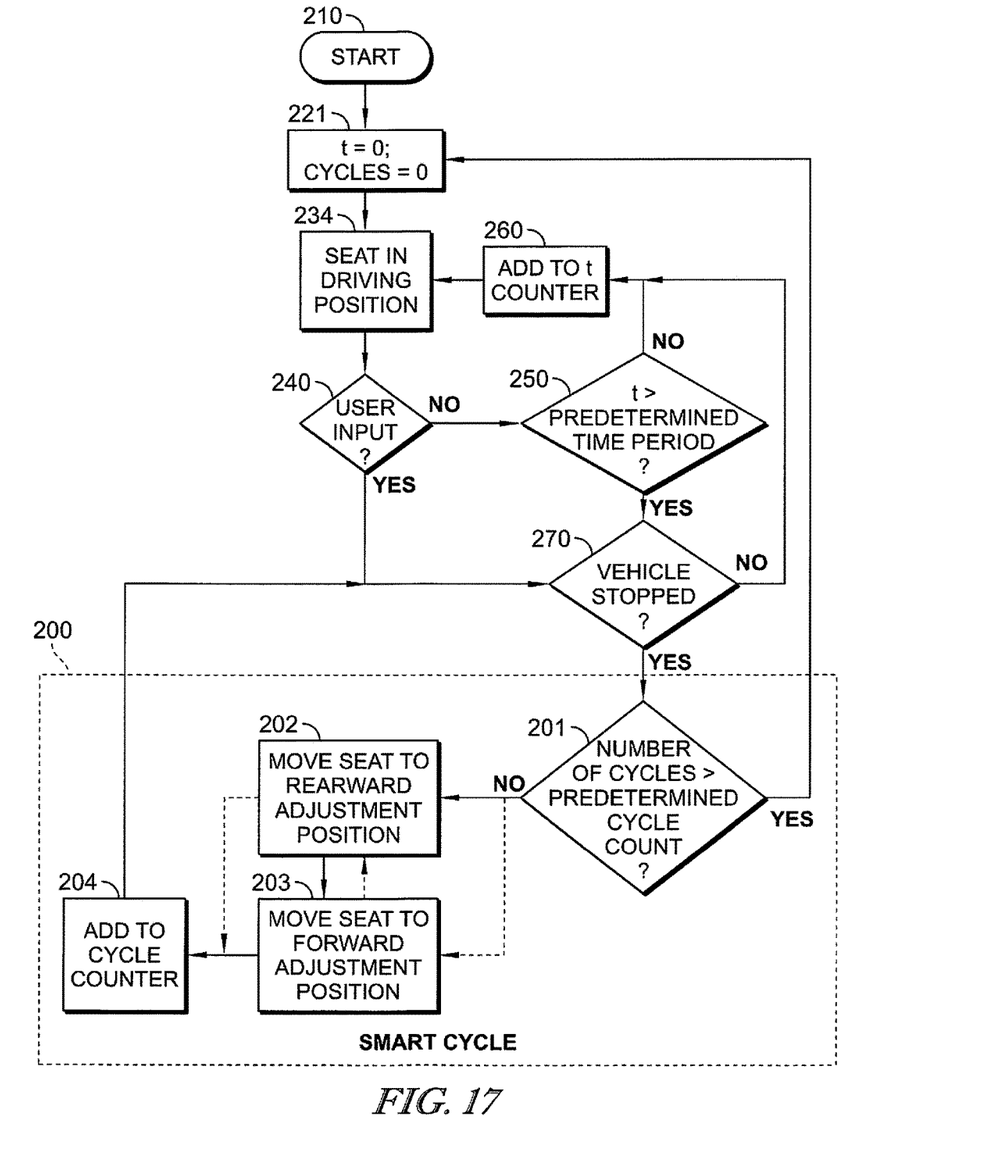
FIG. 17 is a diagrammatic view showing another embodiment of a process used to maximize comfort of an occupant in accordance with the present disclosure.

The adjustment of vehicle seat 12 from rearward adjustment position 62 to forward adjustment position 64 may be repeated by a smart cycle 200 as shown in FIG. 17. Smart cycle 200 is used to relieve stress and fatigue in occupant 13 that may occur after occupant 13 sits in vehicle seat 12 for long periods of time. Smart cycle 200 is configured to adjust vehicle seat 12 from driving position 60, to the rearward adjustment position 62 and then to the forward adjustment position 64 after a predetermined amount of time or after fatigue or stress is sensed by monitoring unit 52. Smart cycle 200 then repeats the movements from rearward adjustment position 62 to forward adjustment position 64 if monitoring unit 52 continues to detect fatigue or stress. After fatigue and stress levels are returned to normal, smart cycle 200 returns vehicle seat 12 to driving position 60.

Computer 42 is configured to receive the sensor signals generated by sensor system 52 and, under some conditions, operate smart cycle 200 as shown in FIG. 17. When occupant 13 enters the vehicle at start 210, monitoring unit 52 senses when occupant 13 first enters vehicle seat 12. At station 221, a time t is equal to zero and a number of cycles performed by smart cycle 200 is also equal to zero. Station 221 sends a signal to computer 42 to automatically start a timer counter which increases the time value.

From station 221, computer 42 adjusts vehicle seat 12 to driving position 60 at station 234. Occupant 13 may manually adjust vehicle seat 12 to a preferred driving position or the driving position 60 may be previously set by occupant 13. The driving position 60 of occupant 13 is assumed to be a pre-determined posture which provides for most comfortable position, and having an associated pelvis-angle position. Smart cycle 200 is configured to adjust vehicle seat 12 until occupant 13 has returned to this position.

If occupant 13 selects a user input at station 240, computer determines if the vehicle is stopped at station 270. Alternatively, if there is no user input at station 240, computer 42 determines if the amount of time t is greater than a predetermined time period programmed into computer 42 at station 250. The predetermined time period may be included in predetermined criteria. If the amount of time t is greater than the predetermined time period, computer 42 determines if the vehicle is stopped at station 270. If the amount of time is less than the predetermined time period, a value of 1 is added to the time counter at station 260.

At station 270, computer determines if the vehicle is stopped. If the vehicle is stopped, smart cycle 200 may automatically initiate. If the vehicle is not stopped, a value of 1 is added to the time counter at station 260.

When smart cycle 200 initiates, computer 42 determines if the number of cycles is greater than a predetermined cycle count at station 201. The predetermined cycle count may be included in the predetermined criteria. If the number of cycles is less than the predetermined cycle count, smart cycle 200 begins adjusting vehicle seat 12 from rearward adjustment position 62 to forward adjustment position 64 at stations 202 and 203. After vehicle seat 12 is adjusted to forward adjustment position 64, computer adds a value of 1 to the cycle counter at station 204. As long as the vehicle is stopped, smart cycle 200 remains initiated until the number of cycles is greater than the predetermined cycle count.

If the number of cycles is greater than the predetermined cycle count, computer 42 returns to station 221 where the time amount and the cycle count is equal to zero. Vehicle seat 12 is then returned to driving position 60 at station 234.

Alternatively, the predetermined time period may be replaced with a predetermined threshold level of fatigue and stress. The predetermined threshold level of fatigue and stress may be included in the predetermined criteria. Computer 42 may be programmed with the threshold level of fatigue and stress. If a level of fatigue or stress sensed in occupant 13 by monitoring unit 52 is greater than the threshold level, smart cycle 200 is initiated. Under this situation, the biometric sensors send a signal to computer 42 to initiate smart cycle 200 to adjust from rearward adjustment position 62 to forward adjustment position 64 to relieve fatigue and stress in occupant 13. Smart cycle 200 resets to station 221 once the sensed level of fatigue or stress in occupant 13 is below the threshold level.

The plurality of bladders 22 may be integrated with motion unit 50. For example, bladders 22 in lower back support 220 and upper back support 222 may be inflated to provide the same motions experienced by occupant 13 described above. In this situation, motion unit 50 only adjusts seat bottom 218 and seat bottom edge 219. Vice versa, bladders 22 may be located in seat bottom 218 while motion unit 50 adjusts lower back support 220 and upper back support 222.

Other methods may be used in smart cycle 100 and 200 other than bladders and motion units. For example, a thermal heat pad may be used to apply heat to occupant 13 to relieve stress and fatigue sensed by user sensor unit 46 and monitoring unit 52. Colling sensations may also be used in vehicle seat 12.

Occupant support system 10 may include a mood-optimizer playlist concept that uses sensor data collected by monitoring unit 52 to change the music playlist provided by sound system of the vehicle. Computer 42 may map an emotional state of an occupant 13 with songs played to determine a response which organizes songs to provide a therapy which minimizes stress. Computer 42 may monitor sensor data to confirm that mood-optimized playlist is having the intended function and make changes in response to the sensor obtained. Additionally, the computer 42 may communicate via Bluetooth, wifi, or any other suitable alterative with a smart phone, iPod, iPad, or any similar technology and use available software to play songs. Computer 42 may identify a mood of occupant 13 and select the most desired song to be played from a playlist.

In one example, the smart cycle may be configured to move both the seat bottom and the seat back periodically to maintain a predetermined position of the driver. In one example, the predetermined position of the driver is for the driver's eyes to remain in the same position relative to a vehicle mirror and vehicle controls while maximizing occupant comfort over time.

The smart cycle may cause the vehicle seat to move and reposition the occupant. Repositioning provides pleasant and comfortable relief from a single set position and enables ergonomically a supported re-positioning. Movement is coordinated to keep a desired orientation of the pelvis and encouraging movement of the spine and reduces the tendency of the occupant to slouch.

In illustrative embodiment, the motion control unit is configured to move the vehicle seat to many different possible configurations. The motion control unit is coupled to vehicle seat and uses at least one actuator to cause the seat cushion to move vertically relative to the vehicle floor and relative to the seat back and to move the seat back relative to the seat cushion and to move the upper seat back relative to the seat bottom.

In illustrative embodiments, the motion control unit further includes a position sensing system configured to provide means of absolute position of the vehicle seat in order to be able to identify the absolute position of the vehicle seat.

The user may be alerted and seat movements are smooth to avoid any disturbance to the user.

In one example, the smart cycle may be initiated automatically by the computer using sensor data and predetermined criteria or manually by the occupant. In another example, the smart cycle may be initiated manually by the occupant after the computer provides a suggestion to the occupant to initiation the smart cycle.

The invention claimed is:

1. An occupant-support system for use in a vehicle, the occupant-support system comprising
a vehicle seat including a seat foundation, a seat bottom coupled to the seat foundation and configured for movement relative to the seat foundation, a lower back support coupled to the seat bottom and configured for movement relative to the seat bottom, and an upper back support coupled to the lower back support and configured for movement relative to the lower back support,
a sensor system including a vehicle sensor unit configured to detect whether the vehicle is stationary or moving and a vehicle-seat sensor unit configured to detect an arrangement of the vehicle seat relative to a floor of the vehicle, the sensor system configured to generate sensor signals associated with inputs provided to the vehicle sensor unit and the vehicle-seat sensor unit,
a computer configured to receive the sensor signals from the sensor system, determine whether the vehicle is stationary or mobile using sensor signals provided by the vehicle sensor unit, determine an original arrangement of the vehicle seat relative to the floor of the vehicle using sensor signals provided by the vehicle-seat sensor unit, determine when a user has been seated on the vehicle seat using signals provided by the vehicle-seat sensor unit, determine when a predetermined time period has passed after the user has sat on the vehicle seat, and determine an adjustment profile for moving the vehicle seat after the predetermined time period has passed using the sensor signals and predetermined criteria, and
a seat-adjustment unit configured to receive one or more commands from the computer associated with the adjustment profile to cause the vehicle seat to move through various positions corresponding to the adjustment profile after the computer determines that the vehicle is stationary.

2. The occupant-support system of claim 1, further comprising a user sensor unit configured to detect biometric information associated with a user seated on the vehicle seat and to generate sensor signals, wherein the computer is configured to receive the sensor signals from the user sensor unit and to determine an adjustment profile for moving the vehicle seat after the predetermined time period has passed using the sensor signals provided by the user sensor unit.

3. The occupant-support system of claim 1, wherein the seat-adjustment unit includes a first actuator coupled to the seat bottom and lower back support, a second actuator coupled to the lower back support and the upper back support, and a motion unit configured to operate the first and second actuators in response to commands provided by the computer.

4. The occupant-support system of claim 3, wherein the lower back support is moved rearward relative to the seat bottom and the upper back support is moved forward relative to the lower back support compared to the original arrangement when the vehicle seat is in a rearward arrangement, and wherein the lower back support is moved forward relative to the seat bottom and the upper back support is moved forward relative to the lower back support compared to the original arrangement when the vehicle seat is in a forward arrangement.

5. The occupant-support system of claim 4, wherein the adjustment profile includes moving from the original arrangement to the rearward arrangement and from the rearward arrangement to the forward arrangement.

6. The occupant-support system of claim 4, wherein the adjustment profile includes moving from the original arrangement to the forward arrangement and from the forward arrangement to the rearward arrangement.

7. The occupant-support system of claim 1, wherein the one or more commands from the computer associated with the adjustment profile to cause the vehicle seat to move through various positions corresponding to the adjustment profile are repeated for a predetermined number of cycles.

8. The occupant-support system of claim 1, further comprising a user interface configured to receive input signals from a user, and wherein the computer is further configured to receive the input signals for determining the adjustment profile.

9. The occupant-support system of claim 1, further comprising a comfort-adjustment unit configured to move relative to the seat back and change an amount of support provided to a lumbar region of an occupant resting on the vehicle seat in any arrangement of the vehicle seat.

10. The occupant-support system of claim 1, wherein the vehicle seat is moved to the original arrangement when the computer determines that the vehicle is mobile.

11. An occupant-support system including
an occupant support including a vehicle seat including a seat bottom adapted to move relative to a floor of a vehicle, a seat back coupled to the seat bottom to move relative to the seat bottom, and a seat foundation arranged to extend between and interconnect the seat bottom to the floor to move selectively relative to the floor, a seat-adjustment unit configured to change an arrangement of the vehicle seat relative to the floor, the seat-adjustment unit including a seat-bottom actuator configured to move the seat bottom relative to the floor and a seat-back actuator configured to move the seat back relative to the seat bottom, and a comfort-adjustment unit configured to change an arrangement of the vehicle seat when in any arrangement independent of movement of the seat-adjustment unit,
a sensor system including a vehicle sensor unit configured to detect whether the vehicle is stationary or moving relative to ground underlying and supporting the vehicle, a vehicle-seat sensor unit configured to detect an arrangement of the vehicle seat relative to the floor of the vehicle, and a user sensor unit configured to detect biometric information associated with a user resting on the vehicle seat, the sensor system configured to generate sensor signals associated with inputs provided to the vehicle sensor unit, the vehicle-seat sensor unit, and the user sensor unit, and
a computer configured to receive the sensor signals from the sensor system, determine whether the vehicle is stationary or mobile using sensor signals provided by the vehicle sensor unit, determine an original arrangement of the vehicle seat relative to the floor of the vehicle using sensor signals provided by the vehicle-seat sensor unit, determine when a user has been seated on the vehicle seat using the vehicle-seat sensor unit, determine when a predetermined time period has passed after the user has sat on the vehicle seat, and determine a set of adjustment sequences for moving the vehicle seat after the predetermined time period has passed using predetermined criteria, sensor signals provided by the vehicle-seat sensor unit, and the user sensor unit, and command the seat-adjustment unit to block movement of the vehicle seat from the original arrangement when the vehicle is moving, and command the comfort-adjustment unit to change an arrangement of the vehicle seat using the set of adjustment sequences.

12. The occupant-support system of claim 11, wherein the comfort-adjustment unit includes a lumbar adjuster coupled to the seat back to move relative to the seat back and change an amount of support provided to a lumbar region of an occupant resting on the vehicle seat in response to commands from the computer as part of the set of adjustment sequences.

13. The occupant-support system of claim 12, wherein the comfort-adjustment unit includes a pneumatic bladder coupled to the vehicle seat to be inflated in response to commands from the computer as part of the set of adjustment sequences.

\* \* \* \* \*